US005645261A

United States Patent [19]

Glynn

[11] Patent Number: 5,645,261

[45] Date of Patent: Jul. 8, 1997

[54] COMPUTER COMPONENT SECURITY DEVICE

[75] Inventor: Kenneth P. Glynn, Township of Raritan, County of Hunterdon, N.J.

[73] Assignee: Ideal Ideas, Inc., Flemington, N.J.

[21] Appl. No.: 380,033

[22] Filed: Jan. 30, 1995

[51] Int. Cl.$^{6}$ .................. F16M 13/00

[52] U.S. Cl. .................. 248/551; 248/231.71; 248/918; 70/58; 70/63

[58] Field of Search .................. 248/228.6, 231.71, 248/917, 918, 551, 552, 553; 70/14, 57, 58, 63

[56] References Cited

U.S. PATENT DOCUMENTS

| | | | |
|---|---|---|---|
| 4,456,315 | 6/1984 | Markley et al. | 248/918 X |
| 4,570,156 | 2/1986 | Nicholas, Jr. | 248/551 X |
| 4,600,250 | 7/1986 | Windham | 248/917 X |
| 4,624,510 | 11/1986 | Jedziniak | 248/917 X |
| 4,884,420 | 12/1989 | Finkel et al. | 248/551 X |
| 5,052,651 | 10/1991 | Guddee | 248/553 X |
| 5,135,197 | 8/1992 | Kelley et al. | 248/918 X |
| 5,161,028 | 11/1992 | Kawata et al. | 248/917 X |
| 5,228,658 | 7/1993 | Kelley | 248/551 |
| 5,288,042 | 2/1994 | Grimm | 248/231.71 X |
| 5,288,049 | 2/1994 | Hays | 248/917 X |
| 5,314,162 | 5/1994 | Kelley | 248/551 X |
| 5,361,610 | 11/1994 | Sanders | 70/14 |
| 5,390,515 | 2/1995 | Essick | 70/14 X |
| 5,397,081 | 3/1995 | Landry et al. | 248/917 X |
| 5,450,271 | 9/1995 | Fukushima et al. | 248/553 X |
| 5,526,226 | 6/1996 | Katoh et al. | 248/552 X |
| 5,595,074 | 1/1997 | Munro | 248/551 X |

OTHER PUBLICATIONS

IBM ThinkPad, Dock I User's Guide (1993), First Edition, pp. 3–4.

*Primary Examiner*—Leslie A. Braun
*Assistant Examiner*—Richard M. Smith
*Attorney, Agent, or Firm*—Kenneth P. Glynn, Esq.

[57] ABSTRACT

The present invention is a computer component securing device. It includes a main housing having a bottom, sidewalls, a front, back and an open top, and at least one cut-out in at least one of the bottom, front, back and sidewalls for passing a table securing device at least partially therethrough; and, a lid having attached thereto a computer securing mechanism for fixedly attaching a computer component thereto. The lid is connected to the main housing so as to have a first, open position whereby a computer component may be attached to the lid and so as to have a second, closed position such that an attached computer component cannot be removed therefrom, but so as to expose the functional aspects of the computer component for utilization by a user when the lid is in its second, closed position. The device also includes: a lock connected to the lid and main housing and adapted so as to permit locking and unlocking of the lid and main housing when the lid is in its second, closed position; and, a table securing mechanism extending through at least one opening in the main housing and connected to the inside of the main housing, and having an attachment mechanism outside of the main housing which is securably connectable to a table. Thus, the table securing mechanism be attached to a table from operating it from the inside of the main housing and, when the lid is in its second, closed position and is locked, the table securing mechanism cannot be unattached from the table without damaging the device or the table to which it is attached.

8 Claims, 7 Drawing Sheets

COMPUTER COMPONENT SECURITY DEVICE

BACKGROUND OF THE INVENTION

1. Field of the Invention

The present invention relates to computer component security devices, and, more particularly, to such devices which may be used for attachment to a table for subsequent long or short term attachment, with subsequent removal without damaging or injuring the table.

2. Information Disclosure Statement

Generally, computer security systems are either bolted to tables, permanently damaging the tables, or require chains or wires looped around legs and thus being vulnerable to casual theft, e.g., merely by lifting the table and dropping the computer and chain down to remove it. Typical is International Business Machine's Security Hook for their Dock I® computer docking station. See IBM's *IBM ThinkPad, Dock I Users Guide* (1993), First Edition, page 3–4.

Notwithstanding the prior art, there seems to be no security systems for safely securing a computer component to a table without damaging the table, except for ineffective systems, and none renders the present invention obvious or unpatentable thereover.

SUMMARY OF THE INVENTION

The present invention is a computer component securing device. It includes a main housing having a bottom, sidewalls, a front, back and an open top, and at least one cut-out in at least one of the bottom, front, back and sidewalls for passing a table securing device at least partially therethrough; and, a lid having attached thereto a computer securing mechanism for fixedly attaching a computer component thereto. The lid is connected to the main housing so as to have a first, open position whereby a computer component may be attached to the lid and so as to have a second, closed position such that an attached computer component cannot be removed therefrom, but so as to expose the functional aspects of the computer component for utilization by a user when the lid is in its second, closed position. The device also includes: a lock connected to the lid and main housing and adapted so as to permit locking and unlocking of the lid and main housing when the lid is in its second, closed position; and, a table securing mechanism extending through at least one opening in the main housing and connected to the inside of the main housing, and having an attachment mechanism outside of the main housing which is securably connectable to a table. Thus, the table securing mechanism may be attached to a table from operating it from the inside of the main housing and, when the lid is in its second, closed position and is locked, the table securing mechanism cannot be unattached from the table without damaging the device or the table to which it is attached.

BRIEF DESCRIPTION OF THE DRAWINGS

The present invention will be more fully understood when the specification herein is taken in conjunction with the drawings appended hereto, wherein.

DETAILED DESCRIPTION OF THE PRESENT INVENTION

The purpose of the present invention is to provide a secure and lock table ("SALT") Device to enable computer users at high risk or other locations to secure computers, computer components, or similar devices, e.g. an IBM® ThinkPad® or Dock I® docking station (IBM®, ThinkPad® and Dock I® are trademarks of International Business Machines Corporation, Research Triangle Park, North Carolina). The devices may be used for general security, for absentee downloading and the like, while having the computer component and the present invention itself secured and locked to a table, to discourage and inhibit theft. The present invention SALT Device is generally reasonably sized, lightweight and is securable to a table, but easily removable at the end of use at that location. Most significantly, the SALT Device is inert to its environment, i.e. it does not damage the computer component (it needs no drilling, bolting or other alterations) and does not damage the table or desk to which it is attached. Further, it is mechanically adaptable to different size tables and is reasonably invulnerable to a potential thief, including strength and cutting considerations.

The present invention has various embodiments adaptable to smooth tables, rough tables, tables with ledges (overhangs) and tables without ledges. There could be tables of any foreseeable depth and width, but most tables would be of reasonable size and thickness. For some applications it is assumed that the tables have smooth, solid surfaces. (By "tables" as used herein is meant any flat surfaced finishing on which computers and/or computer components may be used, including, but not limited to, conventional tables, desks, shelves, credenzas, computer work stations, cabinets and other office furnishings.)

Figure 1:
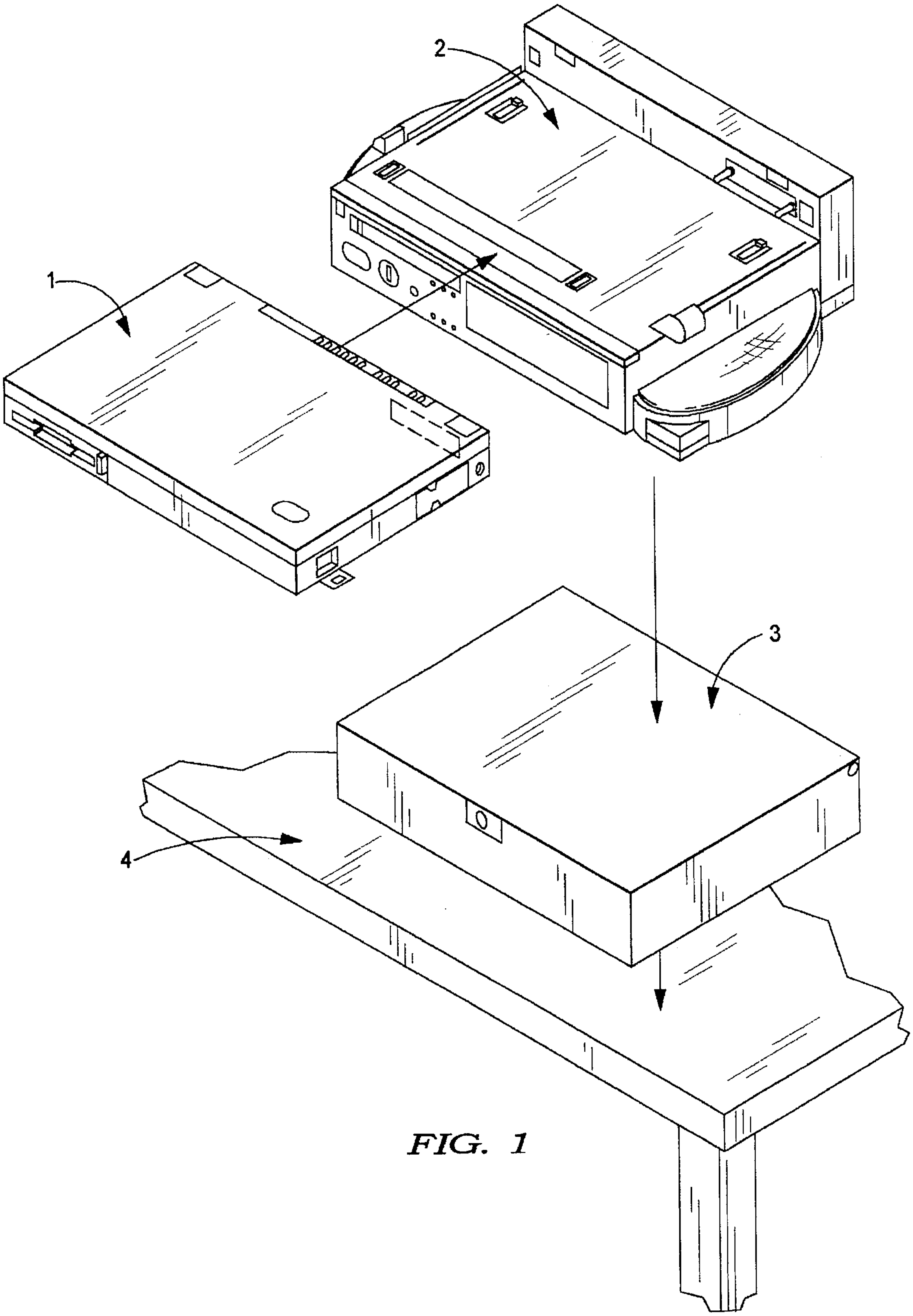
FIG. 1 shows a front perspective view of devices illustrating the general concept of the present invention computer component secure and lock table device.

The SALT Devices contemplated by the present invention herein are attachable to a table and otherwise meet the objectives set forth above. FIG. 1 illustrates the general engineering concept of the present invention, wherein IBM's ThinkPad® 1 computer is removably but lockably nested into a component, namely, the Dock I® docking station 2. Docking station 2 is, at least for the duration of the user's needs, e.g. for one or two semesters at college for a student in a dorm, permanently attached to SALT Device 3.

In turn, SALT Device 3 is, for the same duration, secured and locked to table 4. By this technique, the SALT Device contains securing capabilities for both the computer component i.e. the docking station, and the table (or desk) in a single, portable unit.

Various techniques are contemplated in the present invention device (SALT Device) for securing the computer component to the SALT Device. Such techniques include bolting, strapping, chaining and nest-locking the computer component semi-permanently or permanently to a SALT Device. By using such techniques to secure it to the SALT Device, damage to the computer component is eliminated.

Figure 2:
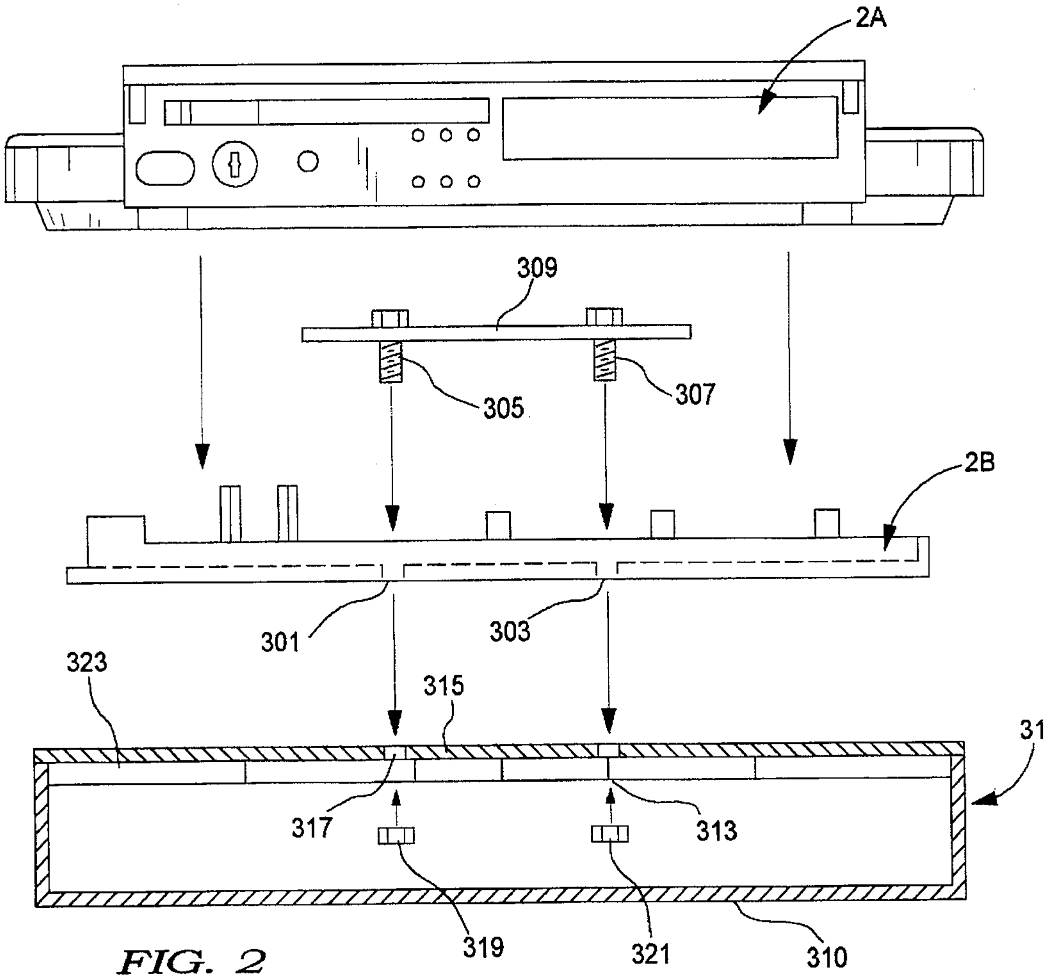
FIG. 2 shows a partial front, partially cut view of one embodiment of the computer securing means aspect of the present invention device.

FIG. 2 shows a computer docking station 2*a* with its bottom cover 2*b* removed (unscrewed). Bottom cover 2*b* would require drilling of orifices such as orifices 301 and 303, with a plurality of bolts such as bolts 305 and 307 passing therethrough, along with an optional strengthening and securing plate 309. These bolts 305 and 307 would be inserted into orifices 301 and 303 in top 315 of SALT Device 31, such as orifices 313 and 317, with subsequent secured fastening, e.g. with conventional nuts 319 and 321. The base 310 of present invention device 31 may be secured to a table by table securing devices not shown in this Figure, but discussed below. Note that top 315 is hingedly connected to base 310 via hinges such as hinge 323.

Figure 3:
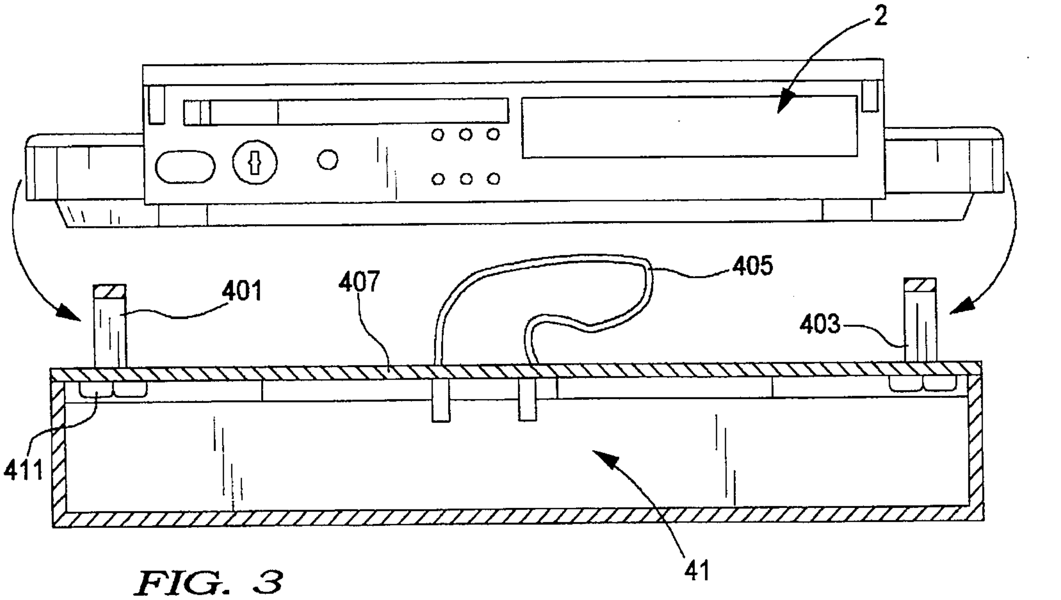
FIG. 3 shows a partial front, partially cut view of another embodiment of the computer securing means aspect of the present invention device.

FIG. 3 shows yet another alternative where conventional docking station 2 does not need to be opened and is secured to SALT Device 41 via metal securing straps 401 and 403, shown cut, and wire loop 405. Again, top 407 of SALT Device 41 may hingedly be opened, closed and be subsequently locked. Metal securing straps 401 and 403 are secured to top 407 with removable pins, e.g. pin 411, on the inside of top 407. The installer or user could have access within the SALT Device 41 to both the docking station securing mechanisms shown and the table securing mechanism not shown but discussed below.

Figure 4:
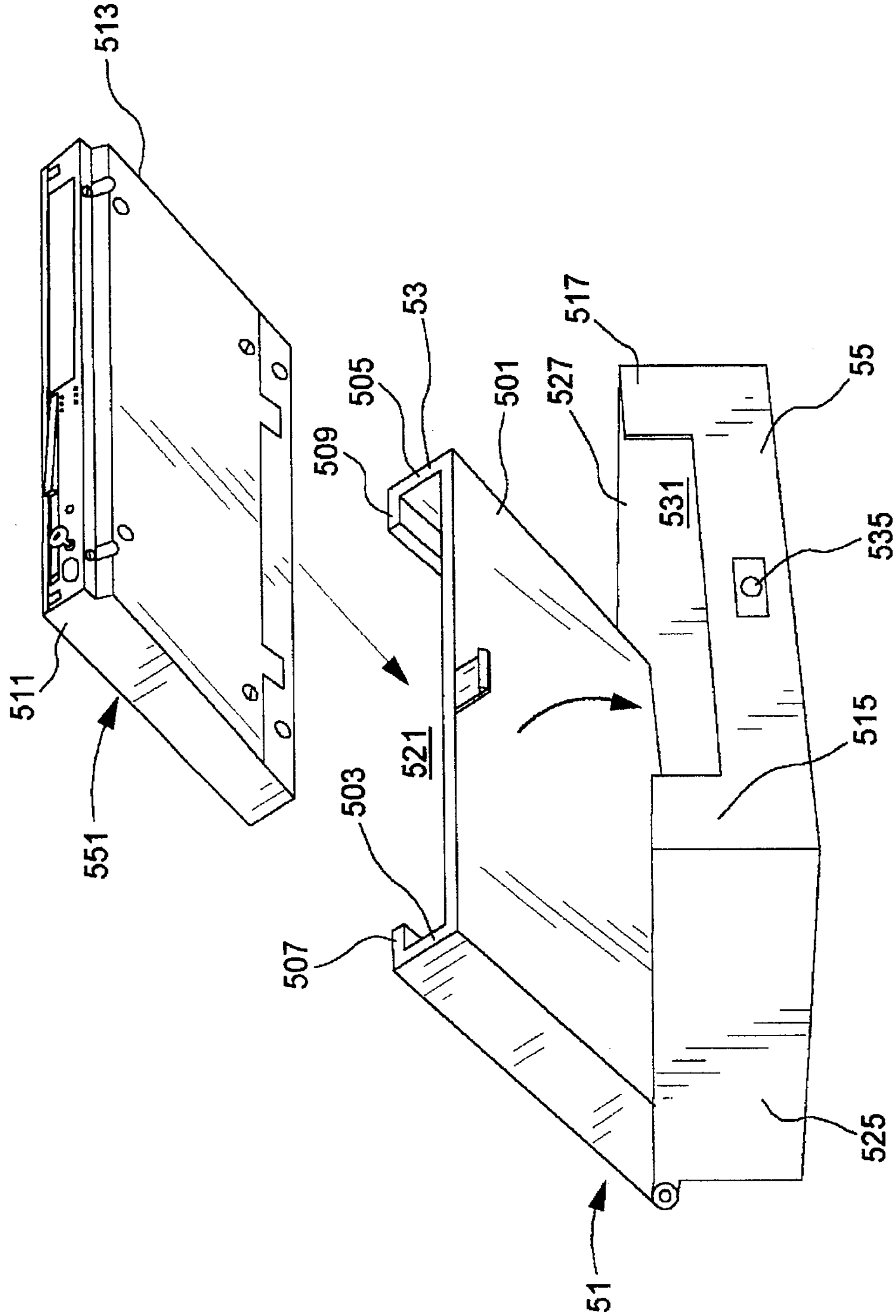
FIG. 4 shows a perspective view of a present invention device using a slide-in and drop-down computer securing mechanism.

FIG. 4 shows yet another alternative approach for securing a computer component, here computer 551, without opening it or altering it. SALT Device 51 has a hingedly mounted lockable top 53 with a bottom 501, sidewalls 503 and 505 and securing ledges 507 and 509. There is an upright back (not seen) and an open front 521, as shown. Side portions 511 and 513 of computer 551 fit under securing ledges 507 and 509. When top 53 is swung down and locked after computer 551 has been inserted, computer 551 cannot be removed because upper front wall sections 515 and 517 of main housing 55 prevent its removal. The cut out area 531 between upper front wall sections 515 and 517 still expose the front of computer 551 for access and use by the user. The main housing 55 has sidewalls 525 and 527 and a back (not shown), and is hingedly connected to top 53. Main housing 55 and top 53 are lockable to one another and the lock 535 could readily be attached to either top 53 or main housing 55.

The above examples illustrate means for securing docking stations to the SALT Device. The most user-friendly, requiring no tools or unfastening and fastening of loops and straps, is the slide-in and drop-down arrangement shown in FIG. 4.

The present invention SALT Device may be secured to any table having either a relatively smooth surface or a ledge. Table securing means for the present invention Device could be suction cups of the swivel lock type, suction cups of the pump-up type, other suction cups, metal rods or flat stock with clamps, other types of clamps, e.g. C-clamps, or anti-theft type steel woven wire extensions with clamps such as hook clamps. Another embodiment would use ratcheted tie-downs which are conventionally used to strap lumber or other items such as snowmobiles to trailers. These would crisscross inside the SALT Device, with the ratcheting mechanisms kept inside the main housing, with opposite ends of one strap with clamp hooks over the opposite sides of a table and a second strap running from front to back. They could be latched onto the table ledges, tightened with conventional ratchet swing levers and locked into the SALT Device. Thus, the criteria for the table securing means component of the present invention are: (1) that is has portions locatable inside a SALT Device main housing and portions extending outside of that main housing; (2) that the table attaching and releasing may be controlled on the inside of the main housing; (3) that a feature outside the main housing actually attaches directly to a table; and (4) that it does not require damaging or altering the table, e.g. the table does not need to be drilled, bolted or screwed.

The following discussions and Figures relate to the table securing means and each may be used in combination with any computer securing means for securing a computer component to the lid of the SALT Device. Since the computer securing means for securing the computer component to the SALT Device are discussed above, they have been removed from these Figures for simplicity, but as mentioned are used in combination in the present invention device.

Figure 5:
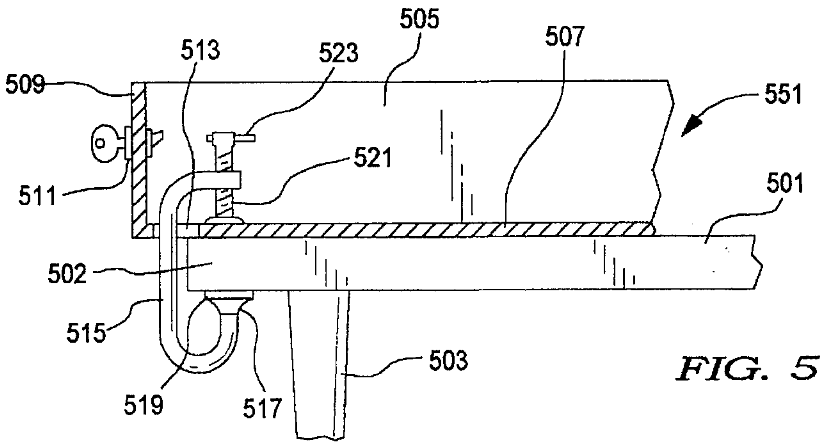
FIG.5 shows a partial side, cut view of a present invention device using partially concealed C-clamp table ledge attachment.

FIG. 5 shows a partial side cut view of a portion of a present invention secure and lock table device. There is shown table 501 with leg 503 and ledge 502. Attached thereto is main housing 551 (with lid and computer attachment means not shown). Main housing 551 is shown in a side cut view, and front 509 has a locking mechanism 511 to lock a lid and, therefore, conceal and render the screwing mechanism 521 of C-clamp 515 inaccessible. The C-clamp 515 is the table securing means and it has an upper portion inside the main housing that includes its operating mechanism (screwing mechanism 521 and turnstyle rod 523), and it has a lower portion with floating clamp head 517 and pad 519. Opening 513 in the bottom 507 of main housing 551 permits the C-clamp 515 to be partially dropped through (e.g., sideways—facing the drawing viewer) and then affixed to ledge 502 and tightened. Typically, two or three such clamps may be used, and, for corner locations front and side clamps could be used together, provided that the main housing had sufficient orifices or knock-outs. Alternatively, the clamps could be used through the back of a main housing and clamped to a back ledge of a desk.

Figure 6:
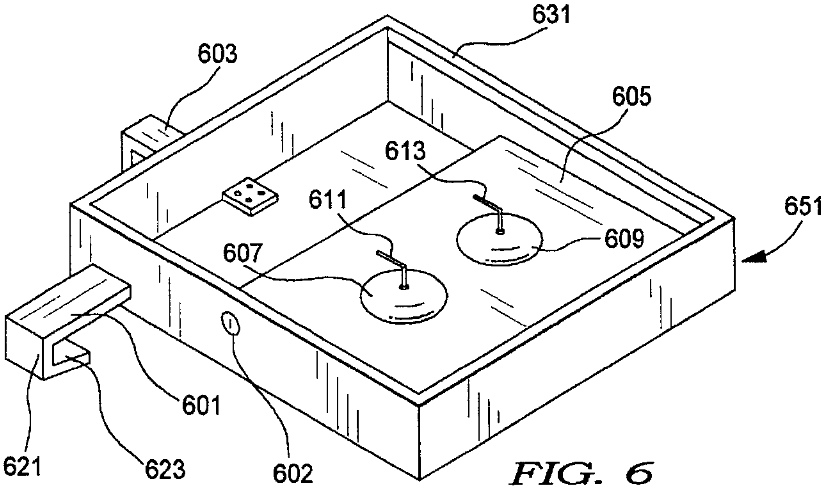
FIG. 6 illustrates a present invention device main housing using fixed length clamps and suction cups for table securing means.

FIG. 6 shows SALT Device main housing 651 having front clamp 601, side clamp 603 and lock 602. Clamp 601 has a vertical portion 621 and an inwardly projecting horizontal portion 623. Inside SALT Device main housing 651 is a raised area 605 with suction cups 607 and 609 having handles 611 and 613, respectively. These may be pump-up types, swivel lock types or simple suction cups. The clamps are welded, screwed, riveted, bolted or otherwise attached to main housing 651 on the inside so as to prevent access when locked. The clamps would secure SALT Device main housing 651 to the front and left side of a table and the suction cups 607 and 609 would prevent any further movement of SALT Device main housing 651 after the suction cups 607 and 609 have been secured to the top of the table. Hinge section 631 is used to hingedly attach a lid with a computer securing means as discussed above.

Figure 7:
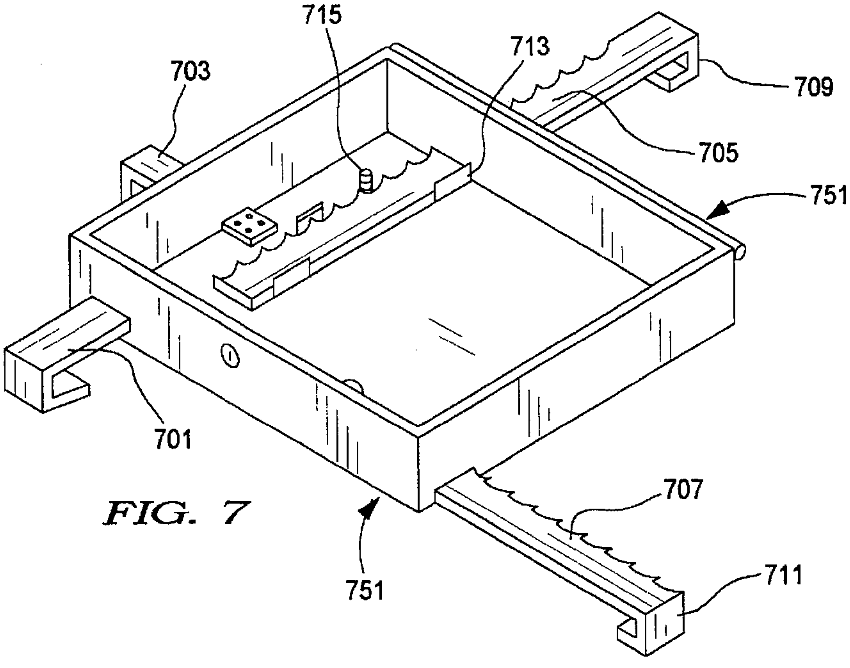
FIG. 7 illustrates a present invention device table securing means made up of four discrete clamps, two of which are of extendable lengths.

FIG. 7 shows a SALT Device main housing 751 with fixed clamps 701 and 703 for securing to the front and left sides of a table and with extendable flat rods 705 and 707 with clamps 709 and 711 respectively. These are extendable and ratcheted or toothed and are slid through guides such as guide 713 and may be locked into a given position by swivel locks such as swivel lock 715. Taking into consideration the dimensions of the Device main housing and the length of the extendable flat rods 705 and 707, they may extend backward to, for example, about 45 inches and outward to about 60 inches (e.g. a base 24 inches wide and an extendable flat rod 40 inches long). The longer extendable flat rod could be stored diagonally within a Device.

Figure 8:
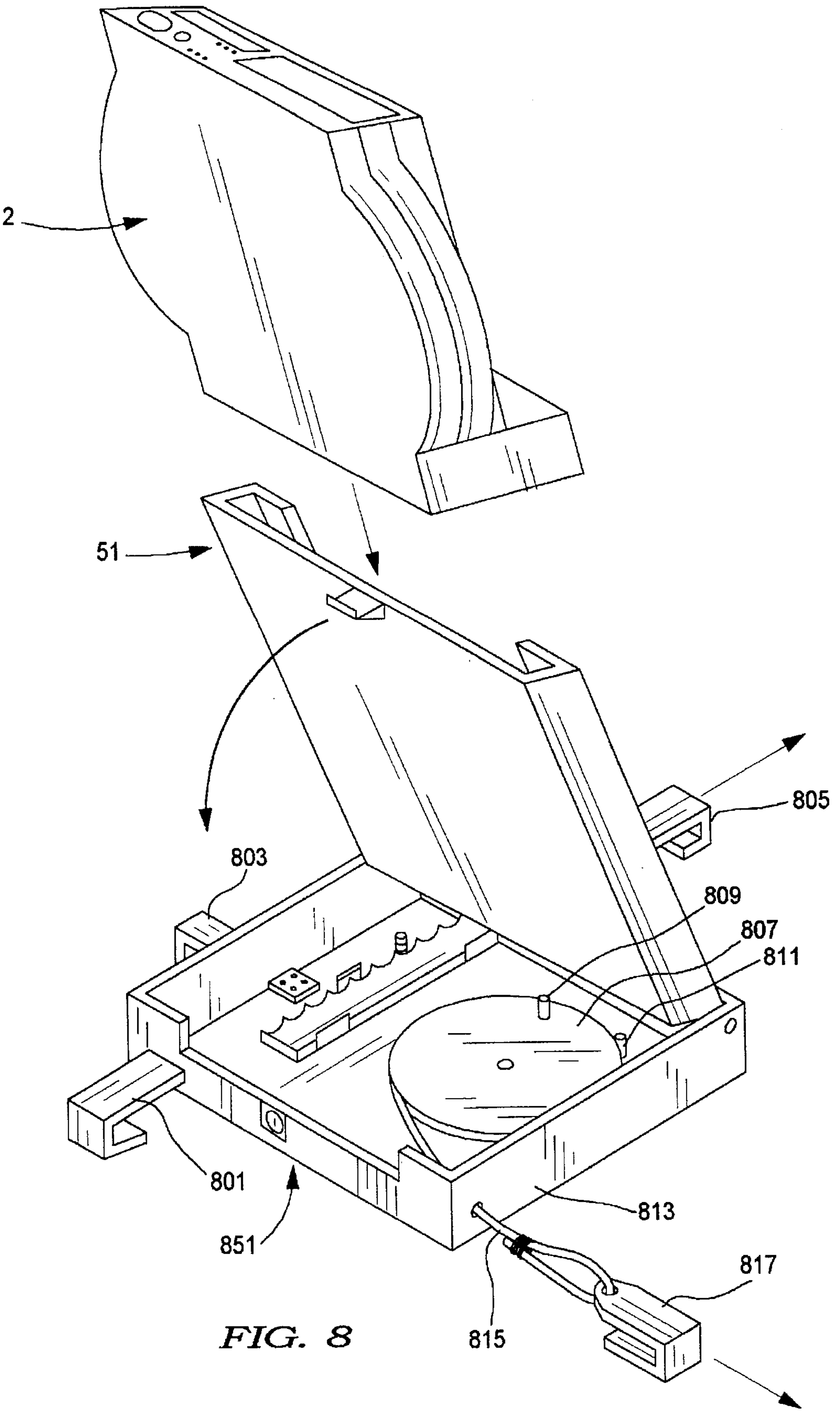
FIG. 8 tows a full perspective view of a present invention device embodiment using a slide-in and drop-down computer component securing means and a combination of fixed clamps, an extendable clamp and a reel, wire and hook clamp for table securing means.

FIG. 8 shows an improved version of the FIG. 7 Device with the left, front and back table securing mechanism being identical to that of FIG. 7, but with a lighter and more extensive right side securing mechanism. Here, main housing 851 is shown hingedly connected to lid 51 for a slide-in, drop-down secure and lock for docking station 2. Device main housing 851 includes clamps 801, 803 and 805 as well as reel 807 with winding handle 809 and locking mechanism 811. Extending therefrom and through wall 813 of main housing 851 is anti-theft cable 815 attached to clamp 817. In this version, cable 815 could extend to any reasonable length desired.

Figure 9:
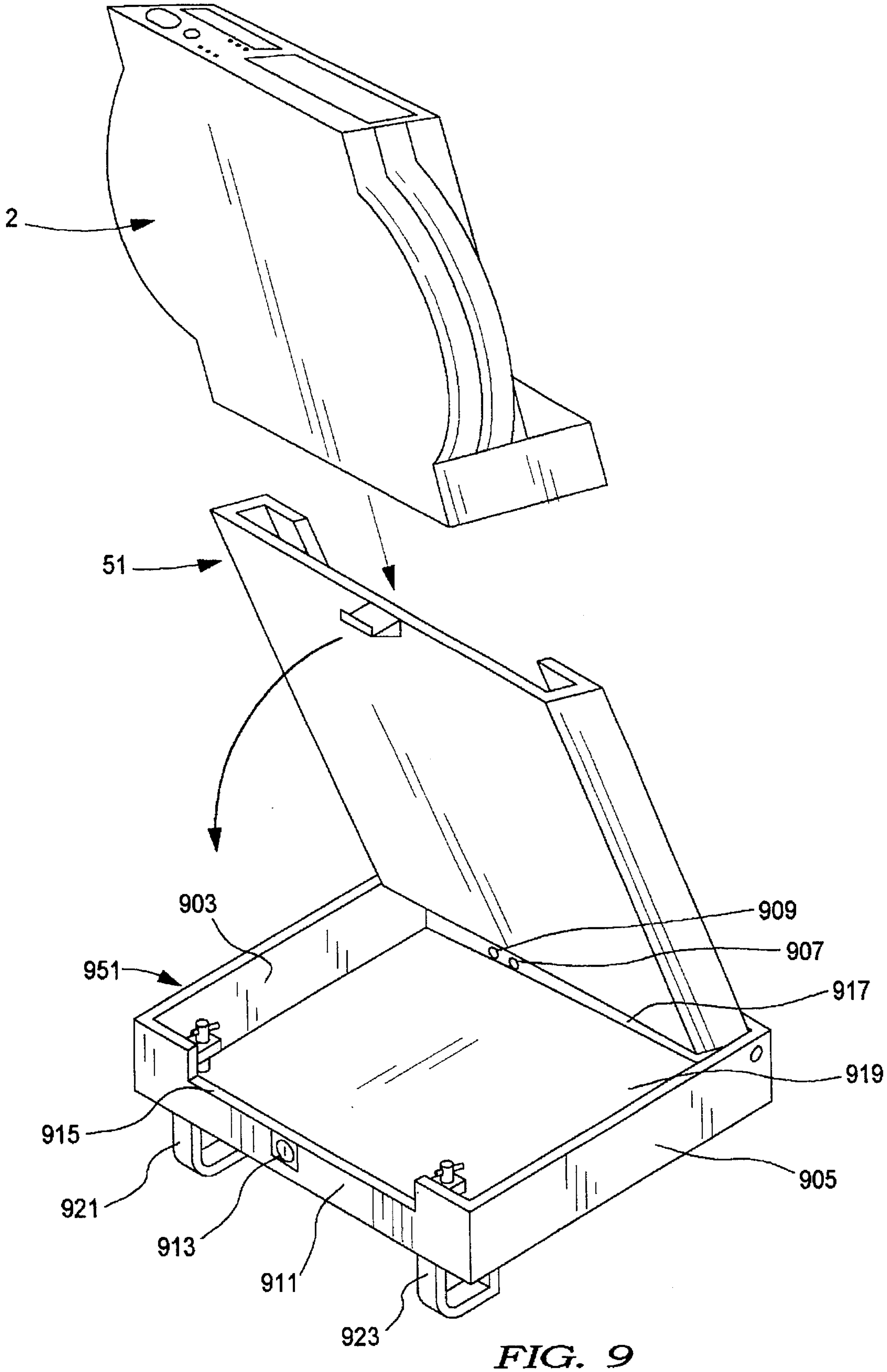
FIG. 9 shows a front perspective view of another embodiment of the present invention device using C-clamps; and, FIG. 10 depicts another embodiment device in a front perspective view using tie-downs for the table securing means.
Figure 10:
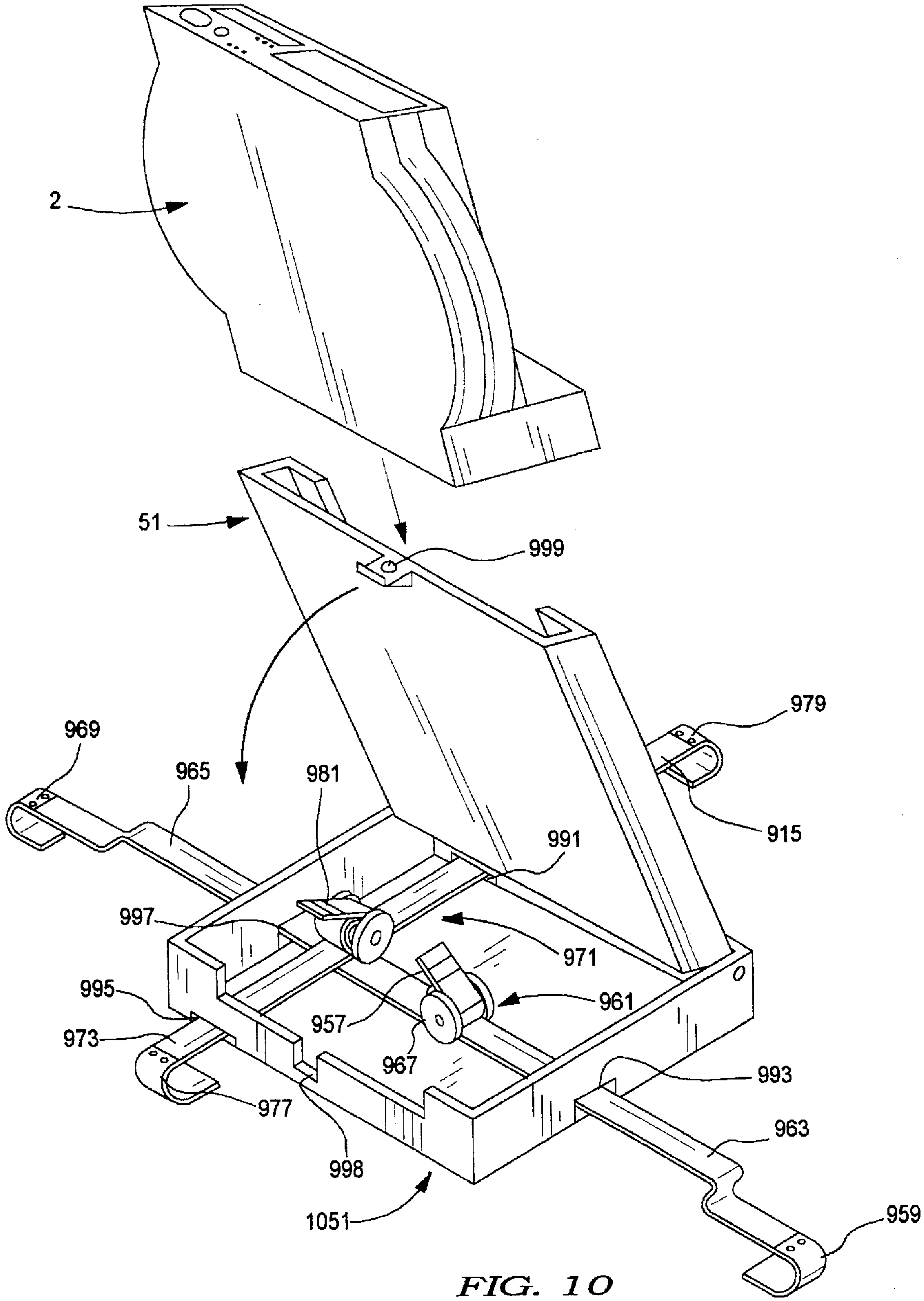

FIGS. 9 and 10 show the same lid 51 and computer docking station 2, and these lids work in an identical manner to that which is shown in FIG. 8; however the table securing mechanisms differ. In FIG. 9, main housing 951 includes bottom 919, an open top as shown, a front 911 with computer accessing cut-out 915 and lock 913, sidewalls 903 and 905, and backwall 917 with modem access orifices 907 and 909 (so that a modem may be securely enclosed and locked into main housing 951). The table securing means involves two C-clamps 921 and 923 through cut-outs in bottom 919, such as is shown in FIG. 5, discussed above and operative in the same manner.

FIG. 10 shows lid 51 with lock 999 and has a slightly modified main housing 1051, with lock receiving latch 998, and with orifices 991, 993, 995 and 997 on the back, front and sidewalls, as shown, for passing tie-down straps therethrough. Here, two sets of tie-downs 961 and 971 are included. Tie-down 961 includes straps 963 and 965 with end hooks 959 and 969, respectively, for attachment to opposite table ledges (e.g., left and right or front and back). There is a coil 967 and ratchet handle 957 for tightening, locking and unlocking the coil 967. Likewise, tie-down 971 includes straps 973 and 975 with hooks 977 and 979 and operative handle 981 and is used to strap the main housing 1051 to other ledges (other than the ones used with tie-down 961) of a table.

Obviously, numerous modifications and variations of the present invention are possible in light of the above teachings. For example, the lid need not be hingedly connected to the main housing—it could be a slide box lid arrangement where the lid slides in and out on a track or groove and can be locked shut. It is therefore understood that within the scope of the appended claims, the invention may be practiced otherwise than as specifically described herein.

What is claimed is:

1. A computer component securing device, which comprises:

(a) a main housing having a bottom, sidewalls, a front, back and an open top, wherein at least one of said front and back has a first cut-out creating a central portion of shorter wall height and outer portions of higher wall height relative to one another, said housing having at least one second cut-out in at least one of said front, back and sidewalls, for passing a table securing device at least partially therethrough;

(b) a lid having a bottom, sidewalls, and a front and back, wherein one of said front and back is sufficiently open to permit a computer component to pass therethrough for a nesting in said lid, the other of said front and back has sufficient height to prevent said computer component from passing therethrough and said sidewalls include inward ledges facing inwardly toward a central area of said lid of sufficient length to prevent said computer component from being lifted upwardly therefrom, said lid being hingedly connected to said main housing so as to have a first, open position whereby said computer component may be slid into and nested in said lid and so as to have a second, closed position such that a nested computer component cannot be removed therefrom but such that said first cut-out on said housing may expose functional aspects of said computer component for utilization by a user when said lid is in its second, closed position;

(c) locking means connected to said lid and said main housing and adapted so as to permit locking and unlocking of one of said lid and said main housing when said lid is in its second, closed position; and, (d) table securing means extending through said at least one second cut-out in said main housing and connected to said main housing inside said main housing, and having an attachment mechanism outside of said main housing which is securably connectable to a table, wherein said table securing means may be attached to said table by operating said table securing means from the inside of said main housing and when said lid is in its second, closed position and is locked said table securing means cannot be unattached from said table without damaging said device or said table to which said table securing means is attached.

2. The device of claim 1, wherein said table securing means includes a clamp for attachment to a ledge of said table.

3. The device of claim 2, wherein said table securing means includes at least one adjustable length clamp.

4. The device of claim 2, wherein there are at least four of said clamps.

5. The device of claim 3 wherein there are at least four of said clamps.

6. The device of claim 1, wherein said table securing means includes at least one security cord, reel and hook clamp.

7. The device of claim 1, wherein said table securing means includes at least one C-clamp.

8. The device of claim 1, wherein said lid is hingedly attached to said main housing.

* * * * *